US008986549B2

(12) United States Patent
Riggers

(10) Patent No.: US 8,986,549 B2
(45) Date of Patent: Mar. 24, 2015

(54) APPARATUS FOR THE TREATMENT OF LIQUIDS

(75) Inventor: Wilfried Riggers, Bremervörde (DE)

(73) Assignee: GEA Westfalia Separator Group GmbH, Oelde (DE)

( * ) Notice: Subject to any disclaimer, the term of this patent is extended or adjusted under 35 U.S.C. 154(b) by 14 days.

(21) Appl. No.: 13/510,832

(22) PCT Filed: Nov. 24, 2010

(86) PCT No.: PCT/EP2010/068140
§ 371 (c)(1),
(2), (4) Date: Jul. 17, 2012

(87) PCT Pub. No.: WO2011/064260
PCT Pub. Date: Jun. 3, 2011

(65) Prior Publication Data
US 2012/0279926 A1    Nov. 8, 2012

(30) Foreign Application Priority Data
Nov. 24, 2009  (DE) .......................... 10 2009 054 387

(51) Int. Cl.
*B01D 1/02*       (2006.01)
*C02F 1/36*       (2006.01)
*C02F 1/32*       (2006.01)
(Continued)

(52) U.S. Cl.
CPC .. *C02F 1/32* (2013.01); *B63J 4/002* (2013.01); *C02F 1/36* (2013.01); *C02F 2103/008* (2013.01)
USPC .............. 210/748.01; 210/748.1; 210/748.11; 210/153; 210/321.6; 210/748.12; 422/21; 422/24; 422/129; 422/186; 422/187

(58) Field of Classification Search
CPC ........................................................ B01D 1/02
USPC ................. 210/747.1, 748.01, 748.1, 748.11, 210/748.12, 750, 767, 153, 263, 264, 321.6, 210/322, 323.1; 422/21, 24, 129, 186, 422/186.3, 187, 600, 243
See application file for complete search history.

(56) References Cited

U.S. PATENT DOCUMENTS

2006/0219630 A1*  10/2006  Abe et al. ....................... 210/600
2009/0166276 A1*   7/2009  Abe et al. ....................... 210/138

FOREIGN PATENT DOCUMENTS

CN          1315742 C     11/2004
DE       298 09 202 U1     7/1998
(Continued)

*Primary Examiner* — Walter D Griffin
*Assistant Examiner* — Cameron J Allen
(74) *Attorney, Agent, or Firm* — Saliwanchik, Lloyd & Eisenschenk

(57) ABSTRACT

The present invention relates to an apparatus for the treatment of liquids, comprising a filter module with a filter, an inlet for liquid, a first outlet for liquid and a second outlet for filtered liquid, wherein the inlet and the first outlet are positioned on a first side of the filter, and the second outlet is positioned on the second side of the filter, a first UV-treatment module with a first UV-light source, wherein the first UV-treatment module is connected with the first outlet of the filter module and adapted to receive liquid from the filter module, and to expose said liquid to UV-light from the first UV-light source, and a second UV-treatment module with a second UV-light source, wherein the second UV-treatment module is connected with the second outlet of the filter module adapted to receive filtered liquid from the filter module, and to expose said liquid to UV-light from the second UV-light source.

10 Claims, 2 Drawing Sheets

Figure 1:
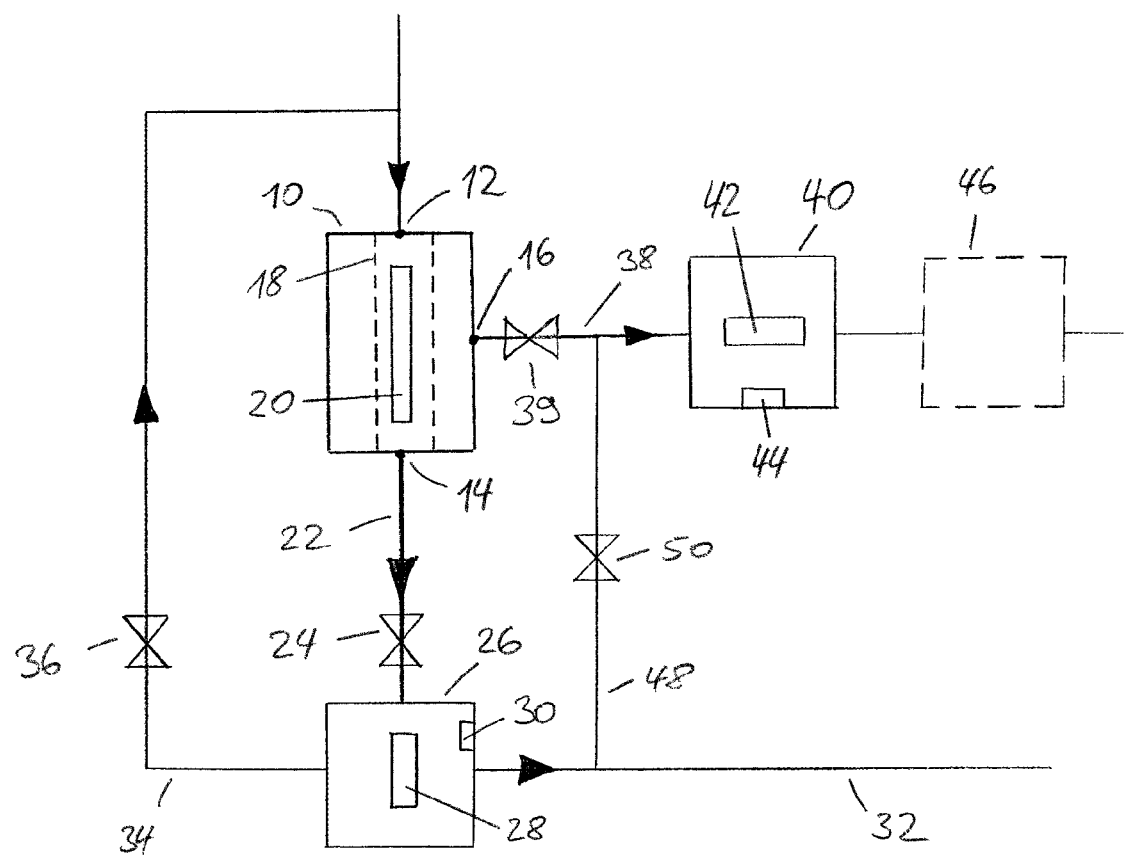

(51) Int. Cl.
*B63J 4/00* (2006.01)
*C02F 103/00* (2006.01)

(56) References Cited

FOREIGN PATENT DOCUMENTS

| DE | 10 2008 008 892 A1 | 8/2009 |
|---|---|---|
| EP | 1 710 209 A1 | 10/2006 |
| JP | H 11-262758 | 9/1999 |
| JP | 2001-293471 | 10/2001 |
| JP | 2002-001319 | 1/2002 |
| JP | 2007-125511 | 5/2007 |
| JP | 2007-130563 | 5/2007 |
| JP | 2007-167805 | 7/2007 |
| JP | 2007-175179 | 7/2007 |
| JP | 2008-080191 | 4/2008 |
| WO | WO 2007/130029 A1 | 11/2007 |

* cited by examiner

APPARATUS FOR THE TREATMENT OF LIQUIDS

CROSS REFERENCE TO A RELATED APPLICATION

This application is a National Stage Application of International Application Number PCT/EP2010/068140, filed Nov. 24, 2010; which claims priority to German Application No. 102009054387.2, filed Nov. 24, 2009; all of which are incorporated herein by reference in their entirety.

The invention relates to an apparatus for the treatment and disinfection of liquids, in particular of ballast water and of (waste) water from industrial processes.

Ballast water is taken up by sea vessels out of the sea in order to stabilize the ship and to ensure its seaworthiness. Nevertheless, through uptake of ballast water at a first location and release of the same at a second location, regularly an introduction of organisms into foreign ecosystems takes place. In order to overcome this, sea vessels are commonly provided with coarse, mechanic filters for a filtration of the ballast water as taken up. Hereby, it is disadvantageous that such filters require a regular maintenance and purification or even a replacement after a particular period of time, as is described in WO 2004/002895 A2.

An improvement is described in WO 2007/130029. The filter element that is clogging over time is rinsed, and thereby regenerated. Nevertheless, also in this case there is no guarantee that the debris as formed on the inside of the filter element is completely removed. Furthermore, the volume of liquid and including the contaminants as detached which has been used for rinsing is discharged into the sea without being treated.

The methods and devices for a purification of ballast water as known from the state of the art thus offer an insufficient flexibility, reliability and environmental safety during the treatment of ballast water. The use of known methods and devices for a treatment of ballast water requires a relatively high maintenance effort, nevertheless, without providing a sufficient protection against the introduction of organisms into foreign ecosystems.

Similar problems are found in the treatment of industrial process liquids, in particular in the treatment of industrial waste waters.

One object of the present invention thus is to provide an apparatus for the treatment of liquids for a treatment and disinfection of liquids, which can be reliably operated with low effort and high flexibility and guarantee a sufficient degree of purity of the liquid as treated.

This object is solved by the combination of features according to claim 1. Advantageous embodiments are the matter of the subclaims.

The apparatus for the treatment of liquids according to the present invention comprises a filter module with a filter, an inlet for liquid, a first outlet for liquid and a second outlet for filtered liquid, wherein the inlet and the first outlet are positioned on a first side of the filter and the second outlet on the second, opposing side of the filter. In other words, the first outlet for liquid for liquid incoming through the inlet is positioned upstream of the filter ("before" the filter), and the second outlet for filtered liquid for liquid incoming through the inlet is positioned downstream of the filter ("after" the filter). Therefore, liquid that is flowing through the inlet must pass through the filter, in order to flow to the second outlet of the filter module, so that filtered liquid flows through the second outlet of the filter module out of the filter module. In contrast, the first outlet, which is positioned on the same side of the filter as the inlet, serves to direct a volume of liquid used for a (back-) flushing of the filter out of the filter module without having to pass through the filter.

The apparatus according to the present invention furthermore comprises a first UV-treatment module with a first UV-light source, wherein the first UV-treatment module is connected with the first outlet of the filter module and adapted to receive liquid from the filter module and to expose the liquid as received to UV-light from the first UV-light source. In doing so, the volume of liquid that is used during (back-) flushing of the filter can be exposed to a treatment with ultraviolet radiation, whereby a disinfecting effect is achieved.

Furthermore, the apparatus according to the invention comprises a second UV-treatment module with a second UV-light source, wherein the second UV-treatment module is connected with the second outlet of the filter module and adapted to receive filtered liquid from the filter module and to expose the liquid as received to UV-light from the second UV-light source. The second UV-treatment module is formed and positioned as a separate module from the first UV-treatment module.

Hereby, it is advantageous that both filtered liquid that flows through the second outlet from the filter module, and liquid that flows through the first outlet of the filter module out of the filter module can be exposed to ultraviolet radiation in a respective, separate UV-treatment module for a disinfection of the respective liquid. In particular, the apparatus for the treatment of ballast water according to the invention offers the advantage that liquid as used in a (back-) flushing operation can be disinfected with ultraviolet light after flowing out of the filter module.

Preferably, the apparatus comprises a first vent between the first outlet of the filter module and the first UV-treatment module and a second vent between the second outlet of the filter module and the second UV-treatment module. Thus, upon opened first vent and closed second vent during operation of the apparatus, liquid will flow from the filter module only to the first UV-treatment module. Therefore, either due to the pressure as present in the filter module or using an active suction, a backflushing of the filter can be achieved by passing liquid that is already filtered but still present in the filter module "backwards" through the filter, and thereby detaches and carries away debris on the side of the filter facing the inlet. In addition, also a flushing process can be performed, wherein additional liquid flows through the inlet of the filter module into the filter module and along the side of the filter being contaminated with debris, so that the debris is detached and flushed out of the filter module through the first outlet. Hereby, it is advantageous that the debris as detached from filter and present in the liquid used for the (back-) flushing can be exposed to a treatment with ultraviolet light, before the liquid, for example in the treatment of ballast water, is either directed back into a ballast water tank or is discharged into the sea.

In contrast, upon an opened second vent and closed first vent liquid from the filter module only flows to the second UV-treatment module, so that the filtered liquid from the filter module can subsequently be exposed to a disinfecting treatment using ultraviolet light.

Preferably, the apparatus furthermore comprises a third UV-treatment module with a third UV-light source that is connected in series with the second UV-treatment module and adapted to receive liquid from the second UV-treatment module and to expose the liquid to UV-light from the third UV-light source. Hereby the effectiveness of the treatment with ultraviolet light is increased, since certain "idle currents" in the second UV-treatment module, that is, flows which are exposed to only a low UV-intensity due to the geometry of the second UV-treatment module, can be treated again in the third module. Additional UV-treatment modules can also be arranged in series downstream of the first UV-treatment module.

Preferably, the second UV-treatment module is connected with the first UV-treatment module and adapted to receive liquid from the first UV-treatment module and to expose the liquid to UV-light from the second UV-light source. Instead of a third UV-treatment module, therefore the liquid which has already been treated with ultraviolet light in the first UV-treatment module can be treated again in the second UV-treatment module. Similarly, the first UV-treatment module can be adapted to receive liquid from the second UV-treatment module, and to expose said liquid to UV-light from the first UV-light source.

Preferably, the inlet of the filter module is connected with the first UV-treatment module, and the filter module is adapted to receive treated liquid from the first UV-treatment module. Therefore, liquid that has been treated with ultraviolet radiation in the first UV-treatment module, can subsequently be directed back into the filter module for a filtration.

Preferably, the filter is positioned in the inside of the filter module and has a cylindrical shape. Preferably, the cylindrical filter encloses the inlet and the first outlet of the filter module and "separates" the inlet/first outlet from the second outlet, so that incoming liquid passes inside out through the filter, in order to leave the filter module through the second outlet as filtered liquid. Alternatively inlet, first/second outlet and filter can also be arranged relative to each other in a manner that incoming liquid passes outside in through the filter, in order to reach the second outlet.

Particularly preferred the apparatus further comprises a device for cleaning the filter, adapted to clean the side of the filter facing the inlet for liquid of the filter module, that is, the side of the filter on which the retained substances accumulate (retentate side). In this respect, this side of the filter does not necessarily need to physically (completely) face the inlet. In addition to devices for cleaning the filter, which purely mechanically detach such debris on the retentate side of the filter, in particular devices for cleaning the filter are included which remove the debris from this side of the filter by suction.

Particularly preferred the device for cleaning the filter thus comprises at least one suction element for cleaning the retentate side of the filter. In order to possibly clean the whole surface of the filter the suction element(s) is/are preferably coupled to a pivotable pipe, where a lower pressure is present relative to the pressure in the inside of the filter module. The relatively low pressure can be achieved either using a suitable suction pump or by a vent, whereby a pressure compensation between the inside of the pipe and the surrounding environment can be produced. Preferably, one end of the suction element, providing a suction opening, is furthermore (nearly) in contact with the side of the filter to be cleaned, so that by means of the difference in pressure between the inside of the filter module and the interior of the pivotable pipe a backflushing flow through the filter and into the suction element can be produced. With the other end, the suction element is attached to the pipe, so that the backflushing flow can flow into the pipe.

Particularly preferred one end of the pivotable pipe is coupled with the first outlet for unfiltered liquid of the filter module. Alternatively, the pipe itself forms the first outlet of the filter module. The accordingly sucked off backflushing liquid can thus be exposed to a disinfection using ultraviolet radiation in the first UV-treatment module.

Alternatively or in addition to a suction of the debris on the side of the filter being in contact with the unfiltered liquid, the device for cleaning the filter preferably comprises at least one first source for ultrasound adapted in order to expose the filter to ultrasound, in order to detach debris that is forming in it.

Particularly preferred an individual source for ultrasound can be provided in each of the above described UV-treatment modules, which is adapted to expose the liquid in the respective UV-treatment module to ultrasound. Hereby, an additional purifying effect is achieved in the liquid.

In a particularly preferred embodiment the apparatus is realized as an apparatus for the treatment of ballast water.

Additional features and advantages of the invention are illustrated in the following description of embodiments with the help of the attached drawings and the claims.

Figure 2:
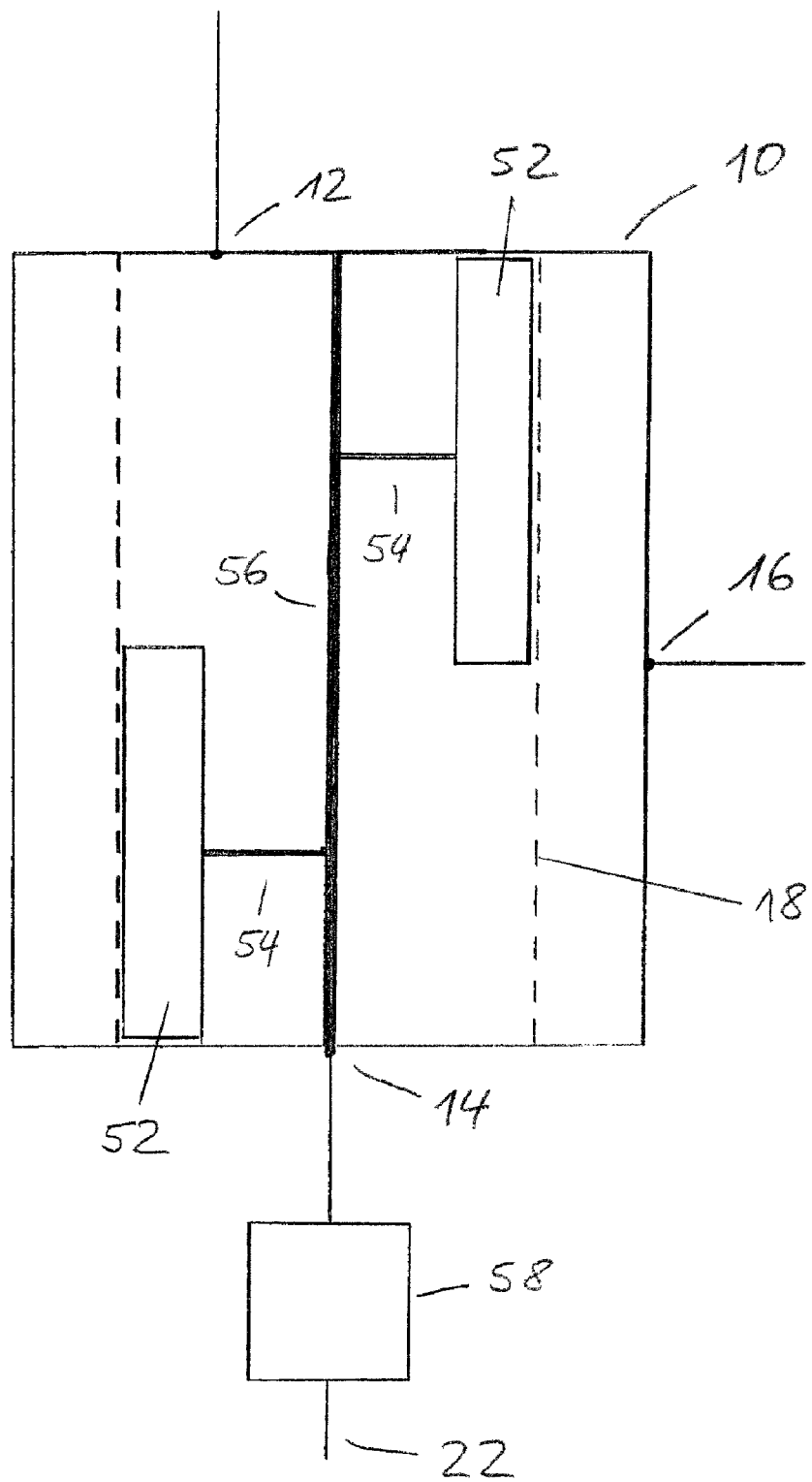

FIG. 1 shows a schematic illustration of a device for the treatment of ballast water according to the invention; and FIG. 2 shows a schematic illustration of a cross-section through a filter module of a device for the treatment of ballast water according to a preferred embodiment.

In FIG. 1 an apparatus 100 for the purification and disinfection of liquid in form of a device for the treatment of ballast water with a filter module 10 is shown, which has the shape of a hollow circular cylinder, and is made of a stainless steel pipe. An inlet 12 for ballast water is positioned at the upper end of the filter module 10, and a first outlet 14 for ballast water is positioned at the lower end. A second outlet 16 is provided on the mantle of the pipe of the filter module 10. The ballast water as incoming through the inlet 12 into the filter module 10 can either be taken up from a ballast water tank (not shown) of a ship on which the apparatus is operated, or from the sea.

In the inside of the filter module 10, a filter 18 in form of a hollow circular cylinder is found. In the embodiment as depicted in FIG. 1, the inlet 12 and the first outlet 14 are positioned on the same side of the filter 18, so that ballast water that is flowing through the inlet 12 can pass through the first outlet 14 out of the filter module 10, without passing through the filter 18. During such a flushing process, the ballast water as passing through can detach and carry away debris from the inside of the filter 18, whereby the filter 18 is cleaned.

Nevertheless, the inlet 12 and the second outlet 16 are positioned on opposing sides of the filter 18, so that liquid flowing through the inlet 12 can only reach the second outlet 16, if said liquid passes through the filter 18.

In this sense, the first outlet 14 is positioned upstream of the filter 18 and the second outlet is positioned downstream of the filter 18. Nevertheless, the inlet and both outlets can also be positioned at a different location of the filter module 10, provided that the inlet and first outlet are positioned upstream/"before" the filter, and the second is positioned outlet downstream/"after" the filter. For example, the inlet 12 can also lead from the bottom into the filter module 10, and not, as shown in FIG. 1, from the top.

In the inside of the filter module 10 furthermore a device for cleaning a filter 20 in form of a rod-shaped source for ultrasound is provided, which exposes the inside of the filter 18 to ultrasound, in order to detach debris forming thereon. This accordingly detached debris can then be flushed through the first outlet 14 of the filter module 10. Alternatively, the source for ultrasound can also be realized in form of a point shaped (piezo-)radiator or other common forms of sources for ultrasound. In particular, piezoelectric sources for ultrasound can be positioned at the mantle of the filter module 10 for a radiation into the inside thereof.

In the embodiment as shown in FIG. 1, the first outlet 14 of the filter module 10 is connected through a line 22, in which a vent 24 is positioned, with a first UV-treatment module 26. Thus, (back-)flushing liquid from the filter module 10 can be directed into the first UV-treatment module 26 and exposed to a treatment with ultraviolet light. For this, the first UV-treatment module 26 has a first UV-light source 28, which is surrounded by a quartz coating, and is circulated by the liquid flow to be treated.

In order to increase the purifying effect, a source for ultrasound 30 for exposing the liquid in the module 26 to ultrasound is also provided in the module 26 in addition to the UV-light source. The accordingly purified and disinfected liquid then can either be directed through a line 32 back into a ballast water tank (not shown) or into the sea, or can be directed through a line 34 with a vent 36 back to the inlet 12 of the filter module 10.

The second outlet 16 of the filter module 10 is connected with a second UV-treatment module 40 through a line 38 with a vent 39, which has a second UV-light source 42 and a source for ultrasound 44. As can be seen in FIG. 1, the first and the second UV-treatment modules are two separately designed and separately arranged modules for a UV-treatment. The filtered liquid, which passes through the second outlet 16 from the filter module 10, thus can be exposed to ultraviolet radiation after the filtration process, and additionally can be exposed with ultrasound energy. Hereby, an additional purification effect is achieved. The accordingly purified and disinfected ballast water can then either be treated further in a third UV-treatment module 46, or immediately can be directed back into the ballast water tank or into the sea.

Upon closed first vent 24 and opened second vent 39, the ballast water, which is taken up either from the ballast water tank or the sea (not shown), can also be also be filtered in the filter module 10, and subsequently can be additionally treated at least in the second UV-treatment module 40 in particular using ultraviolet radiation. In contrast, upon a closed vent 39 and an opened vent 24, a cleaning of the filter 18 can take place either through flushing or backflushing. For flushing, ballast water passes through the inlet 12 into the filter module 10, runs along the inside of the filter 18, and flushes away debris from the inside of the filter 18 during flowing through the first outlet 14 out of the filter module 10. For backflushing already filtered ballast water on the "clean" side of the filter 18 again passes through the filter 18 (due to a difference in pressure between the inside of the filter module 10 and the line 22) in opposite direction, and thereby detaches debris from the "contaminated" side of the filter 18 facing the inlet 12. The detached debris is then carried out of the filter module 10 through the first outlet 14.

For an amplification of the disinfecting and purification effect for the liquid passing through the first outlet 14 out of the module 10, liquid that was treated in the first UV-treatment module 26 can be directed into the second UV-treatment module 40 through an additional line 48 with a vent 50.

In FIG. 2, an alternative embodiment of the filter module 10 of FIG. 1 in a cross-sectional view is shown.

According to the second embodiment of the apparatus 100, the filter module 10 as depicted in FIG. 2 for cleaning the inside of the filter 18 comprises a device for cleaning a filter 20 having two suction elements 52 for a cleaning of the side of the filter 18 facing the inlet 12 of the filter module 10, instead of a device for cleaning a filter 20 in form of an elongated source for ultrasound, as it is provided in the first embodiment.

The suction elements 52 at their respective one end are connected with a pivotable pipe 56 through a respective bridge 54, and at their respective other end are attached to the inside of the filter 18, or at least have a small distance to it. Through a suction opening (not shown) of the respective suction element 52 facing the inside of the filter 18, liquid from the filter module 10 can be sucked into the suction element 52 and through the bridge 54 into the pipe 56. In order to produce a suitable negative pressure in the pipe 56, a pump 58 is provided in the line 22, into which pipe 56 branches at the first outlet 14. Alternatively, also a suitable vent can be employed instead of the pump, whereby the interior of the pipe 56 is set at surrounding pressure.

Through this suction and the proximity of the suction opening to the inside of the filter 18, essentially only already filtered liquid passes through the filter 18, whereby possible debris is detached from the inside, and is transported through the suction opening into the suction element and further through the pipe 56 into the line 22.

Both suction elements 52 as shown in the cross-section of FIG. 2 are positioned on the pipe 56 offset to another in the circumferential direction by 180 degrees, but have a small overlap in the axial direction of the pipe 56. Hereby, it is ensured that upon pivoting of the pipe 56 using a driving mechanism (not shown) both suction elements 52 cover and clean the complete inside of the filter 18.

The pipe 56 is centrally positioned in the cylindrical filter module 10 and parallel to the longitudinal axis of the filter module 10.

Modifications of the above described embodiments are possible within the scope of the claims.

The invention claimed is:

1. An apparatus for the treatment of liquids, comprising:
a filter module with a filter, an inlet for liquid, a first outlet for liquid and a second outlet for filtered liquid, wherein the inlet and the first outlet are positioned on a first side of the filter and the second outlet is positioned on a second side of the filter;
a first UV-treatment module with a first UV-light source, wherein the first UV-treatment module is connected with the first outlet of the filter module and is adapted to receive liquid from the filter module, and to expose said liquid to UV-light from the first UV-light source;
a second UV-treatment module with a second UV-light source, wherein the second UV-treatment module is connected with the second outlet of the filter module and is adapted to receive filtered liquid from the filter module and to expose said liquid to UV-light from the second UV-light source; and
a first vent between the first outlet of the filter module and the first UV-treatment module and a second vent between the second outlet of the filter module and the second UV-treatment module, so that upon an open first vent and a closed second vent liquid from the filter module only reaches the first UV-treatment module, and upon an open second vent and closed first vent liquid from the filter module only reaches the second UV-treatment module,
wherein the second UV-treatment module is connected with the first UV-treatment module and adapted to receive liquid from the first UV-treatment module and to expose said liquid to UV-light from the second UV-light source.

2. The apparatus according to claim 1, further comprising a third UV-treatment module with a third UV-light source, wherein the third UV-treatment module is coupled in series with the second UV-treatment module and is adapted to receive liquid from the second UV-treatment module and to expose said liquid to UV-light from the third UV-light source.

3. The apparatus according to claim 1, wherein the inlet of the filter module is connected with the first UV-treatment module and the filter module is adapted to receive liquid from the first UV-treatment module.

4. The apparatus according to claim 1, wherein the filter is positioned inside the filter module and has a cylindrical shape.

5. The apparatus according to claim 1, further comprising a filter purification device, which is adapted to clean a retentate side of the filter.

6. The apparatus according to claim 5, wherein the filter purification device comprises at least one suction element for a cleaning of the retentate side of the filter and the suction element is coupled to a pivotable pipe.

7. The apparatus according to claim 6, wherein one end of the pivotable pipe is connected with the first outlet for unfiltered liquid of the filter module.

8. The apparatus according to claim 5, wherein the filter purification device comprises at least one first source for ultrasound, which is adapted to expose the filter to ultrasound.

9. The apparatus according to claim 1, wherein at least one of the UV-treatment modules comprises a source for ultrasound, which is adapted to expose the liquid in the respective UV-treatment module to ultrasound.

10. A method for treating a liquid wherein said method comprises introducing the liquid into an apparatus of claim 1.

* * * * *